(12) United States Patent
Tamura

(10) Patent No.: US 7,020,612 B2
(45) Date of Patent: Mar. 28, 2006

(54) FACILITY RETRIEVAL APPARATUS AND METHOD

(75) Inventor: Fumio Tamura, Saitama (JP)

(73) Assignee: Pioneer Corporation, Tokyo (JP)

( * ) Notice: Subject to any disclaimer, the term of this patent is extended or adjusted under 35 U.S.C. 154(b) by 581 days.

(21) Appl. No.: 09/976,029

(22) Filed: Oct. 15, 2001

(65) Prior Publication Data

US 2002/0046029 A1    Apr. 18, 2002

(30) Foreign Application Priority Data

Oct. 16, 2000 (JP) ............................ P2000-315194

(51) Int. Cl.
*G10L 15/00* (2006.01)
(52) U.S. Cl. ...................................... 704/275; 701/209
(58) Field of Classification Search ................ 704/270, 704/275; 701/200, 209
See application file for complete search history.

(56) References Cited

U.S. PATENT DOCUMENTS

| 5,337,347 A | 8/1994 | Halstead-Nussloch et al. ... 379/67 |
| 5,956,684 A * | 9/1999 | Ishii et al. .................. 704/275 |
| 6,763,332 B1 * | 7/2004 | Fujii .......................... 704/275 |

FOREIGN PATENT DOCUMENTS

| EP | 0 875 842 A2 | 11/1998 |
| EP | 0 935 123 A2 | 8/1999 |

* cited by examiner

*Primary Examiner*—Daniel Abebe
(74) *Attorney, Agent, or Firm*—Drinker Biddle & Reath LLP

(57) ABSTRACT

Area names and classified facility names which are fed in through a given procedure are recognized as a narrowing-down condition by simultaneously referring to all of the category name dictionary and area name dictionary as a narrowing-down dictionary in order to acquire the number of facilities satisfying the narrowing-down condition. When the number of facility names is equal to and smaller than the predetermined number of facilities, a facility name dictionary is prepared and the voice recognition processing of the facility name received with voice is performed by the use of the facility name dictionary thus prepared.

10 Claims, 7 Drawing Sheets

FIG. 2

| AREA \ CATEGORY | AMUSEMENT PARK | GOLF COURSE | HOT-SPRING RESORT | CITY HALL | HIGH SCHOOL | ...... | STATION | ...... | TOTAL |
|---|---|---|---|---|---|---|---|---|---|
| HOKKAIDO PREFECTURE | 20 ITEMS | 90 ITEMS | 95 ITEMS | 100 ITEMS | 200 ITEMS | ...... | 300 ITEMS | ...... | 2,415 ITEMS |
| AOMORI PREFECTURE | 5 ITEMS | 60 ITEMS | 80 ITEMS | 95 ITEMS | 35 ITEMS | ...... | 70 ITEMS | ...... | 1,035 ITEMS |
| AKITA PREFECTURE | 6 ITEMS | 65 ITEMS | 95 ITEMS | 85 ITEMS | 40 ITEMS | ...... | 80 ITEMS | ...... | 1,113 ITEMS |
| ...... | | | | | | ...... | | ...... | ...... |
| OKINAWA PREFECTURE | 2 ITEMS | 20 ITEMS | 20 ITEMS | 20 ITEMS | 45 ITEMS | ...... | 0 ITEM | ...... | 107 ITEMS |
| SAPPORO CITY | 3 ITEMS | 50 ITEMS | 35 ITEMS | 1 ITEM | 30 ITEMS | ...... | 8 ITEMS | ...... | 381 ITEMS |
| ...... | | | | | | ...... | | ...... | ...... |
| KARUIZAWA | 1 ITEM | 2 ITEMS | 1 ITEM | 3 ITEMS | 50 ITEMS | ...... | 2 ITEMS | ...... | |
| NASUKOGEN | 1 ITEM | 2 ITEMS | 2 ITEMS | 4 ITEMS | 0 ITEM | ...... | 3 ITEMS | ...... | |
| ...... | | | | | | ...... | | ...... | ...... |
| YAMANOTE LINE | 0 ITEM | 0 ITEM | 0 ITEM | 0 ITEM | 0 ITEM | ...... | 29 ITEMS | ...... | |
| ...... | | | | | | ...... | | ...... | ...... |
| TOTAL | 190 ITEMS | 945 ITEMS | 1,640 ITEMS | | | | | | |

FIG. 3

| CATEGORY / AREA | AMUSEMENT PARK | GOLF COURSE | HOT-SPRING RESORT | CITY HALL | HIGH SCHOOL | STATION | ..... |
|---|---|---|---|---|---|---|---|
| HOKKAIDO PREFECTURE | RECOGNITION DICTIONARY 1 | RECOGNITION DICTIONARY 2 | RECOGNITION DICTIONARY 3 | RECOGNITION DICTIONARY 4 | RECOGNITION DICTIONARY 5 | RECOGNITION DICTIONARY 6 | ..... |
| AOMORI PREFECTURE | RECOGNITION DICTIONARY 20 | RECOGNITION DICTIONARY 21 | RECOGNITION DICTIONARY 22 | RECOGNITION DICTIONARY 23 | RECOGNITION DICTIONARY 24 | RECOGNITION DICTIONARY 25 | ..... |
| AKITA PREFECTURE | RECOGNITION DICTIONARY 40 | RECOGNITION DICTIONARY 41 | RECOGNITION DICTIONARY 42 | RECOGNITION DICTIONARY 43 | RECOGNITION DICTIONARY 44 | RECOGNITION DICTIONARY 45 | ..... |
| ..... | ..... | ..... | ..... | ..... | ..... | ..... | ..... |
| OKINAWA PREFECTURE | RECOGNITION DICTIONARY 920 | RECOGNITION DICTIONARY 921 | RECOGNITION DICTIONARY 922 | RECOGNITION DICTIONARY 923 | RECOGNITION DICTIONARY 924 | RECOGNITION DICTIONARY 925 | ..... |
| SAPPORO CITY | RECOGNITION DICTIONARY 940 | RECOGNITION DICTIONARY 941 | RECOGNITION DICTIONARY 942 | RECOGNITION DICTIONARY 943 | RECOGNITION DICTIONARY 944 | RECOGNITION DICTIONARY 945 | ..... |
| ..... | ..... | ..... | ..... | ..... | ..... | ..... | ..... |
| KARUIZAWA | RECOGNITION DICTIONARY 20000 | RECOGNITION DICTIONARY 20001 | RECOGNITION DICTIONARY 20002 | RECOGNITION DICTIONARY 20003 | RECOGNITION DICTIONARY 20004 | RECOGNITION DICTIONARY 20005 | ..... |
| NASUKOGEN | RECOGNITION DICTIONARY 20020 | RECOGNITION DICTIONARY 20021 | RECOGNITION DICTIONARY 20022 | RECOGNITION DICTIONARY 20023 | RECOGNITION DICTIONARY 20024 | RECOGNITION DICTIONARY 20025 | ..... |
| ..... | ..... | ..... | ..... | ..... | ..... | ..... | ..... |
| YAMANOTE LINE | RECOGNITION DICTIONARY 21300 | RECOGNITION DICTIONARY 21301 | RECOGNITION DICTIONARY 21302 | RECOGNITION DICTIONARY 21303 | RECOGNITION DICTIONARY 21304 | RECOGNITION DICTIONARY 21305 | ..... |
| ..... | ..... | ..... | ..... | ..... | ..... | ..... | ..... |

FACILITY RETRIEVAL APPARATUS AND METHOD

BACKGROUND OF THE INVENTION

1. Field of the Invention

The present invention relates to a voice recognition apparatus and method for controlling equipment by recognizing the voice received from a user and more particularly to attempting to improve voice input operation.

2. Description of the Related Art

Use of electronic equipment using voice recognition for man-machine interface is on the increase in recent years. A car navigation is one example of the equipment. Such a car navigation functions as what is used to guide a vehicle from the present position up to a destination by designating a desired place to set the destination, searching for a route from the present position of the vehicle up to the destination and displaying the route together with a map on a display.

The designation of a place through voice operation in a car navigation is performed by voicing and inputting a message sequentially according to a guidance message, including the kinds of facilities such as schools, hospitals and stations existing in an intended place and finally designating a proper name in the place, for example, a facility name of "Meguro Station".

However, due to the fact that the number of facilities tends to increase, a message of the facility name has been voiced after the intended number of facilities is narrowed down to a certain extent according to the area and category in order to specify the desired facility by means of voice recognition, which is intended to shorten response time, to improve the recognition ratio and to simplify the processing of the same name by narrowing down the intended number of facilities.

A facility retrieval procedure in a car navigation utilizing conventional voice recognition will now be described below.

At the initial stage, a control command dictionary for operating the car navigation is set on the system side. A user voices a command to "set a destination" whereby to transfer to the system an intention of setting a route up to a destination.

As the number of facilities is enormous though retrieving a specific place as a destination on the system side is needed, it is not practical to specify a place with voice recognition once because a reduction in the recognition ratio. In order to reduce the number of facilities as an object of retrieval, narrowing-down is performed on the category side. First, in order to have narrowing-down performed on a category basis, the system voices a guidance message of (1) "A category, please" after the recognition dictionary is replaced with the category name dictionary so as to urge the user to voice a message of the category name. In order to cope with this, when the user voices a message of (2) an "educational facility", a voice recognition device recognizes the message.

As the system makes it a rule to have a detailed category designated as long as the education facility is concerned, a guidance message of (3) "Next category name, please" is outputted after the recognition dictionary is replaced with a sub-category name dictionary whereby to urge the user to voice the sub-category name. When the user voices a message of (4) "high school" therefor, the voice recognition device recognizes the message.

With the sub-category thus decided, the recognition dictionary is replaced with a prefectural name dictionary in order to perform narrowing-down in the area and then a guidance message of (5) "A prefectural name, please" is voiced to urge the user to narrow down the area with the municipality as a unit.

When the user voices (6) "the Metropolis of Tokyo", the voice recognition device recognizes the message as "the Metropolis of Tokyo". In case where the sub-category is "a high school" and the municipal name is "the Metropolis of Tokyo", the system makes it a rule to have a municipal name designated. The recognition dictionary is replaced with a municipal name dictionary and then a guidance message of (7) "A municipal name, please" is outputted to urge the user to voice a municipal name. When the user voices (8) "Shibuya Ward", the voice recognition device recognizes the message. As the number of facilities has sufficiently been narrowed down until then by the designations above, retrieval of the facility name is started.

The system then outputs a guidance message of (9) "Name, please" after replacing the recognition dictionary with a high school dictionary in Shibuya-ku to urge the used to voice a facility name. When the user voices "A ○○ educational institution", the voice recognition device recognizes the message and sets the ○○ educational institution as a destination.

However, the narrowing-down of prefectures has been determined on the system side beforehand in the conventional system, it is needed to voice category and area names in the designated order when the category and area names are designated. Thus, the user is compelled to follow the procedure.

SUMMARY OF THE INVENTION

An object of the present invention made to solve the foregoing problems is to provide a facility retrieval apparatus and method capable of making a user easily retrieve facilities.

In order to solve the foregoing problems, according to a first aspect of the invention, there is provided a facility retrieval apparatus comprising: an area name dictionary stored with area names, a classified name dictionary stored with classified names of facilities, a facility name dictionary stored with facility names, input means for receiving and taking in the area names, the classified names and the facility names, identifying means for identifying names received and simultaneously distinguishing between area names and classified names as the occasion demands, and extracting means for extracting a facility name belonging to the name identified by the identifying means from the facility name dictionary.

According to a second aspect of the invention, there is provided a facility retrieval apparatus comprising: an area name dictionary stored with area names, a classified name dictionary stored with classified names of facilities, a facility name dictionary stored with facility names, input means for receiving and taking in the area names, the classified names and the facility names, identifying means for deciding whether the name received is an area name or a classified name, number-of-facilities extracting means for extracting the number of facilities belonging to the name identified by the identifying means from the facility name dictionary, extracting means for extracting a facility name belonging to the name identified by the identifying means from the facility name dictionary in case where the number of facility names extracted by the number-of-facilities extracting means is equal to or smaller than the predetermined number thereof, and urging means for performing narrowing-down further in case where the number of facility names extracted by the number-of-facilities extracting means is greater than the predetermined number thereof.

According to a third aspect of the invention, there is provided a facility retrieval apparatus comprising: an area name dictionary stored with area names, a classified name dictionary stored with classified names of facilities, a facility name dictionary stored with facility names, number-of-facility-names storage means for storing the number of facility names belonging to each area name and each classified name, input means for receiving and taking in the area names, the classified names and the facility names, identifying means for deciding whether the name received is an area name or a classified name, number-of-facilities extracting means for extracting the number of facilities belonging to the name identified by the identifying means from the facility name dictionary, extracting means for extracting a facility name belonging to the name identified by the identifying means from the facility name dictionary in case where the number of facility names extracted by the number-of-facilities extracting means is equal to or smaller than the predetermined number thereof, and urging means for performing narrowing-down further in case where the number of facility names extracted by the number-of-facilities extracting means is greater than the predetermined number thereof.

According to a fourth aspect of the invention, in a facility retrieval apparatus according to the second or third aspect of the invention, when the number of facility names extracted by the number-of-facilities extracting means is equal to or greater than the predetermined number thereof and in case where the name identified by the identifying means is the classified name, the urging means urges the inputting of the area name and the extracting means extracts a facility name belonging to both the area and classified names thus identified from the facility name dictionary.

According to a fifth aspect of the invention, in a facility retrieval apparatus according to the second or third aspect of the invention, when the number-of-facility names extracted by the number-of-facilities extracting means is equal to or greater than the predetermined number thereof and in case where the name identified by the identifying means is the area name, the urging means urges the inputting of a further detailed area name and in case where the name identified by the identifying means is the classified name, on the other hand, the urging means urges the inputting of the further detailed classified name.

According to a sixth aspect of the invention, in a facility retrieval apparatus according to any one of the first to third aspects of the invention, the input means is voice input means for inputting voice.

Further, according to a seventh aspect of the invention, in a facility retrieval apparatus according to any one of the second to fifth aspects of the invention, the urging means reports the number of facility names extracted by the extracting means.

According to an eighth aspect of the invention, in a facility retrieval apparatus according to any one of the first to seventh aspects of the invention, names provided by combining a plurality of classified names are stored in the classified name dictionary.

According to a ninth aspect of the invention, in a facility retrieval apparatus according to the eighth aspect of the invention, negative names other than the classified names are provided in the classified name dictionary.

According to a tenth aspect of the invention, in a facility retrieval apparatus according to any one of the second to fifth aspects of the invention, in case where the identifying means is unable to specify one name out of the names received, the urging means urges the inputting of a name for the specifying purpose.

According to an eleventh aspect of the invention, in a facility retrieval apparatus according to the tenth aspect of the invention, in case where the identifying means is unable to specify one name out of the names received, the urging means urges the inputting of a further detailed name belonging to the classified or area name for the specifying purpose.

With the arrangement above, as it is possible to narrow down the number of facilities by giving the narrowing-down condition that the user has without relying on the narrowing-down condition on the system side, the designation of the category (facility classification) may be made approximately when a narrowing-down area can be designated in detail. Thus, the narrowing-down can be effected in a manner corresponding to the information owned by the user, so that a facility retrieval apparatus using voice recognition with the least restriction imposed on the user can be provided.

According to a twelfth aspect of the invention, there is provided a facility retrieval method comprising the steps of: acquiring the predetermined number of facility names from area names and classified facility names received in accordance with a given procedure by referring to dictionaries, providing a facility name dictionary in case where the number of facility names is equal to or smaller than the predetermined number of facilities and retrieving the facility name received.

According to a thirteenth aspect of the invention, a facility retrieval method according to the twelfth aspect of the invention further comprises the steps of deciding whether the name received is an area name or a classified name, urging the inputting of a name belonging to any name other than the name to which one distinguished name belongs and extracting a facility name corresponding to one name and any other name both.

Thus, a problem arising from rendering area or category name retrieval infeasible because the area or category name is not found out can be cleared up as the user is allowed to freely designate a condition without restriction imposed by the system and to retrieve a facility name by means of voice, whereby retrieval corresponding to information in possession of the user.

BRIEF DESCRIPTION OF THE DRAWINGS

FIG. 2 is a diagram showing a format of facility condition data for acquiring the number of facilities conforming to a prescribed condition according to the invention.

FIG. 3 is a diagram showing a format of facility name recognition dictionary data for preparing a category name recognition dictionary conforming to a prescribed condition according to the invention.

DETAILED DESCRIPTION OF THE PREFERRED EMBODIMENTS

Figure 1:
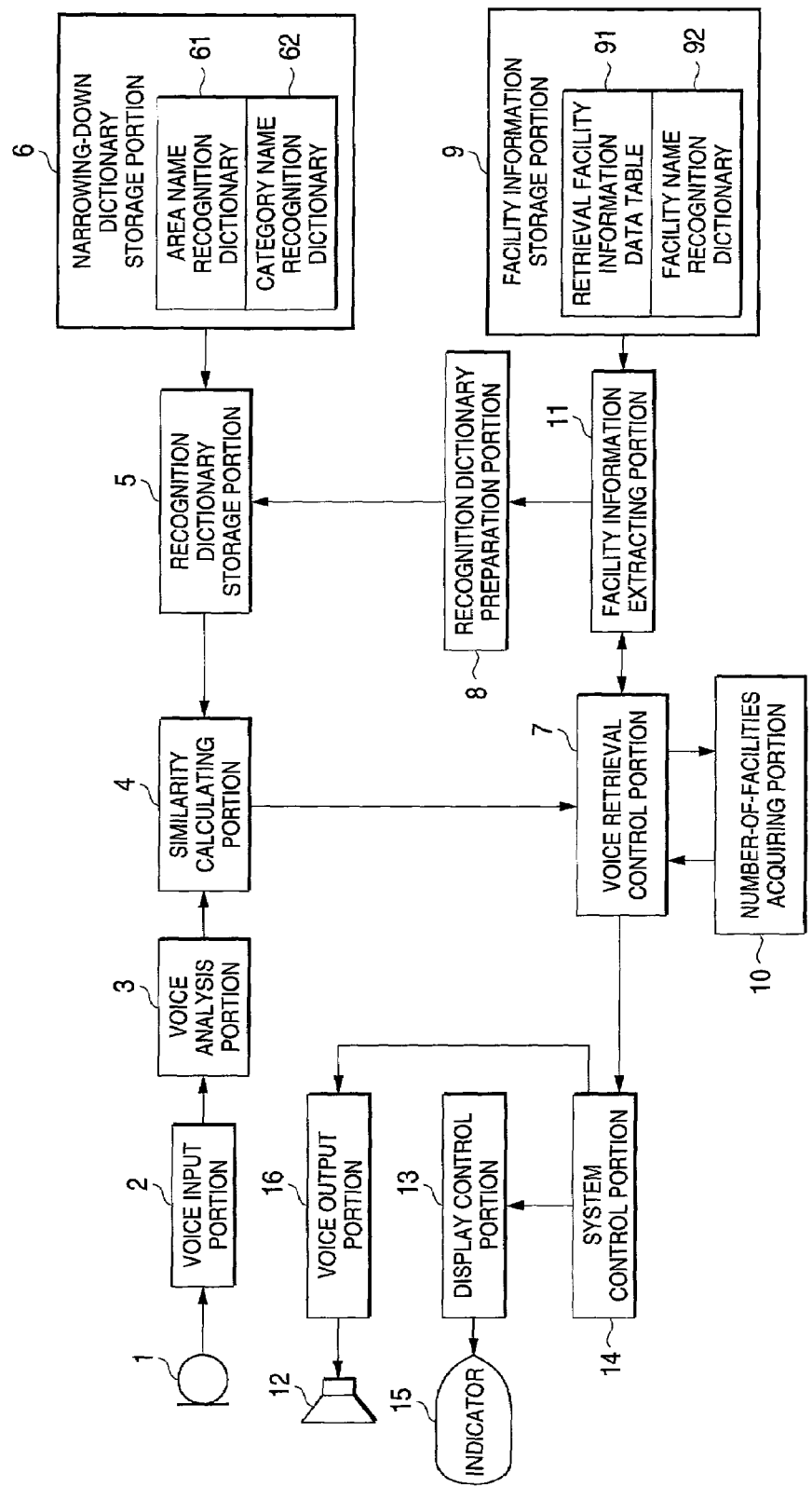
FIG. 1 is a block diagram of a facility retrieval apparatus by means of voice recognition as an embodiment of the present invention.

FIG. 1 is a block diagram of a facility retrieval apparatus embodying the present invention. A car navigation apparatus is shown herein as the facility retrieval apparatus by way of example. In FIG. 1, a microphone 1 takes in the message voiced by a user and a voice input portion 2 converts the aural signal taken in via the microphone 1 into voice information and supplies the voice information into a voice analysis portion 3. The voice analysis portion 3 analyzes the voice information thus supplied as voice characteristic parameters and supplies the results of analysis to a similarity calculating portion 4.

In a narrowing-down dictionary portion 6, a narrowing-down condition dictionary is stored as a voice recognition dictionary having a plurality of word parameters forming words and phrases as objects of recognition. The narrowing-down condition dictionary includes a area name recognition dictionary 61 stored with word parameters indicating area names such as names of prefectures and municipalities for use in retrieving spots and a category name recognition dictionary 62 stored with word parameters indicating category names such as kinds of facilities existing at designated spots. In this case, there are stored area and category numbers corresponding to the respective area and category names.

A recognition dictionary storage portion 5 stores word parameters as objects for matching processing in the recognition of the voice supplied from the narrowing-down dictionary portion 6 or a recognition dictionary preparation portion 8 which will described later. The similarity (recognition score) between the voice characteristic parameters analyzed in the voice analysis portion 3 and the whole reference voice information stored in the recognition dictionary storage portion 5 is calculated by the similarity calculating portion 4 which changes the similarity into numerical values. Of the reference voice information stored in the recognition dictionary storage portion 5, what has great similarity (what has a small recognition score) resulting from the calculation performed by the similarity calculating portion 4 is supplied by the similarity calculating portion 4 to a voice retrieval control portion 7 as a recognition word together with the area number or category number that the recognition word indicates.

When the result of recognition is an area name or a category name, the voice retrieval control portion 7 distinguishes the area name from the category name and stores the area or category name in the form of an area or category number in a built-in narrowing-down condition storage memory (not shown) and sends the result of recognition to a number-of-facilities acquiring portion 10. The number-of-facilities acquiring portion 10 is stored with a number-of-facilities retrieval table shown in FIG. 2 and obtains the number of facilities coinciding with the designated narrowing-down condition indicated by the result of recognition sent from the number-of-facilities retrieval table and supplies the number of facilities to the voice retrieval control portion 7.

In case where the number of facilities outputted from the number-of-facilities acquiring portion 10 is the predetermined number of facilities (that can be stored in the recognition dictionary storage portion 5) or smaller, the voice retrieval control portion 7 produces an aural output with that number of facilities as an answering message and in order to produce an aural output as an answering message for urging the feeding of their facility names, supplies this message to a system control portion 14. Further, the voice retrieval control portion 7 supplies the narrowing-down condition such as the area and category names together with the area or category numbers stored in the narrowing-down condition storage memory to a facility information extracting portion 11.

In case where the number of facilities outputted from the number-of-facilities acquiring portion 10 exceeds the predetermined number of facilities (that can be stored in the recognition dictionary storage portion 5), the voice retrieval control portion 7 produces an aural output with the number of facilities as an answering message and in order to produce an aural output as an answering message for narrowing-down areas or categories in detail, supplies this message to the system control portion 14.

The facility information extracting portion 11 reads facility names satisfying the narrowing-down condition such as the area and category names fed from the voice retrieval control portion 7 from a facility information storage portion 9 and supplies the result thus read to the recognition dictionary preparation portion.

The facility information storage portion 9 is provided with a retrieval facility information data table 91 for retrieving recognition dictionary numbers of FIG. 3, and a facility name dictionary portion 92 stored with reference voice information indicating proper names of the facilities stored by making detailed information correspond to the respective facilities, the detailed information including recognition dictionary numbers, areas in which the facilities exist, categories to which the facilities belong, the longitude and latitude of each facility, the address and telephone number of each facility, service contents and the like.

The recognition dictionary preparation portion 8 converts the reference voice information fed from the facility information extracting portion 11 into the word parameter for effecting voice recognition and supplies the word parameter to the recognition dictionary storage portion 5.

The system control portion 14 controls a display control portion 13 and an aural output portion 16 according to an aural output instruction in the answering message from the voice retrieval control portion 7 and the display output of the result of facility retrieval. In response to the instruction from the system control portion 14, the display control portion 13 displays characters representing the answering message, those representing the present narrowing-down condition and the position of the retrieved facility on a map. Moreover, the system control portion 14 controls an indicator 15 so as to display detailed information on such as service contents in facilities. The aural output portion 16 subjects the answering message to speech synthesis under the instruction from the system control portion 14.

The number-of-facilities retrieval table stored in the number-of-facilities acquiring portion 10 is shown in FIG. 2. The number-of-facilities retrieval table is a table including the number of facilities satisfying the narrowing-down condition of category names and area names out of the facilities stored in the facility information data table 9 by forming a matrix of areas and categories. For example, there are stored 190 items satisfying the narrowing-down condition in the category of amusement parks and 20 items satisfying the narrowing-down condition in the area of Hokkaido out of the 190 items.

In this case, not only prefectural and municipal name levels but also, for example, the area name level referring to such as Nasukogen and Karuizawa is included in the area names. Consequently, a table of descriptions is prearranged due to the fact that in case where the number of facilities over the whole country is attempted to obtain by adding up the number of facilities on a detailed area level, several thousand additions will be needed. However, the aforementioned process will not be needed in a system capable of realizing several thousand subtractions and additions at a sufficiently high speed by causing the facility information extracting portion 11 to refer to the facility information storage portion 9 to obtain the number of facilities.

Moreover, only addresses but also names of railroad lines and expressways are also included in the area. The number-of-facilities acquiring portion 10 obtains the number of facilities by referring to the table shown in FIG. 2 according to the area and category numbers instructed from the voice retrieval control portion 7 and returns the results to the voice retrieval control portion 7.

FIG. 3 shows the retrieval facility information data table 91 stored in the facility information storage portion 9. In this data table exists a matrix of the same areas and the categories as those in the number-of-facilities retrieval table of the number-of-facilities acquiring portion 10, and recognition dictionary numbers satisfying a combination of each of the areas and categories are stored therein. The facility information extracting portion 11 obtains a recognition dictionary number from the retrieval facility information data table 91 shown in FIG. 3 according to the combination of area and category names instructed from the facility voice retrieval control portion 7 and also obtains reference voice information on the facility names with the recognition dictionary attached thereto from the facility name dictionary portion 92 and supplies the results thus obtained to the recognition dictionary preparation portion 8.

Facility retrieval operations according to this embodiment of the invention will now be described in detail with reference to flowcharts of FIGS. 4 to 8.

Figure 4:
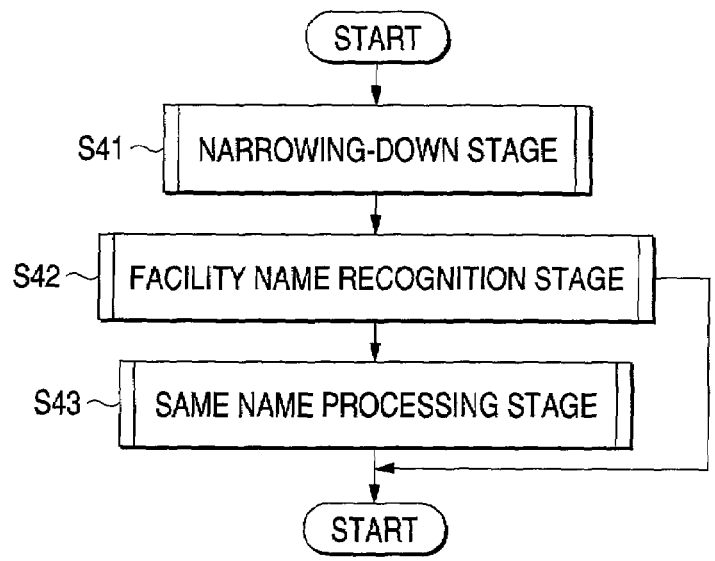
FIG. 4 is a flowchart showing the basic operation according to the invention.

FIG. 4 shows the basic facility retrieval operation. In FIG. 4, the first step (Step S41) refers to a narrowing-down stage at which the number of facilities conforming the condition designated by the combination of area and category names is acquired and the operation of narrowing down a retrieval range until the number of facilities actually reaches the number or smaller at which the facility name voice recognition is possible. The second stage (Step S42) refers to a facility name recognition stage at which voice recognition is made after the facility name recognition dictionary conforming the condition designated at the first stage is prepared and a facility name is specified. The third stage (Step S43) refers to a the same-name processing stage at which in case where there are a plurality of facility names withholding the voice recognition at the second stage, a target name is determined out of the plurality of candidates by narrowing down the condition.

Figure 5:
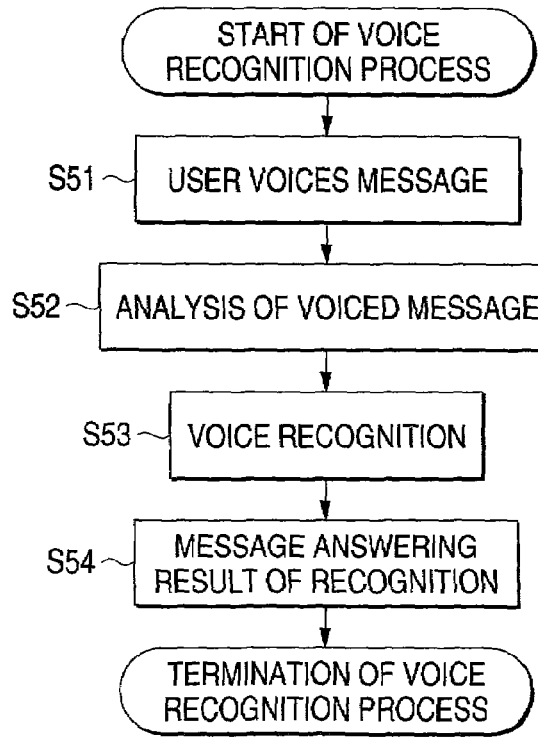
FIG. 5 is a flowchart showing a voice recognizing operation according to the invention.

FIG. 5 shows the steps for processing the same voice recognition as before including urging a user to voice a message (Step S51), analyzing the voiced message to carry out voice recognition and sending back the result of recognition with a message (Steps S52–S54) (a detailed flow of the voice recognition steps, which returns back).

Figure 6:
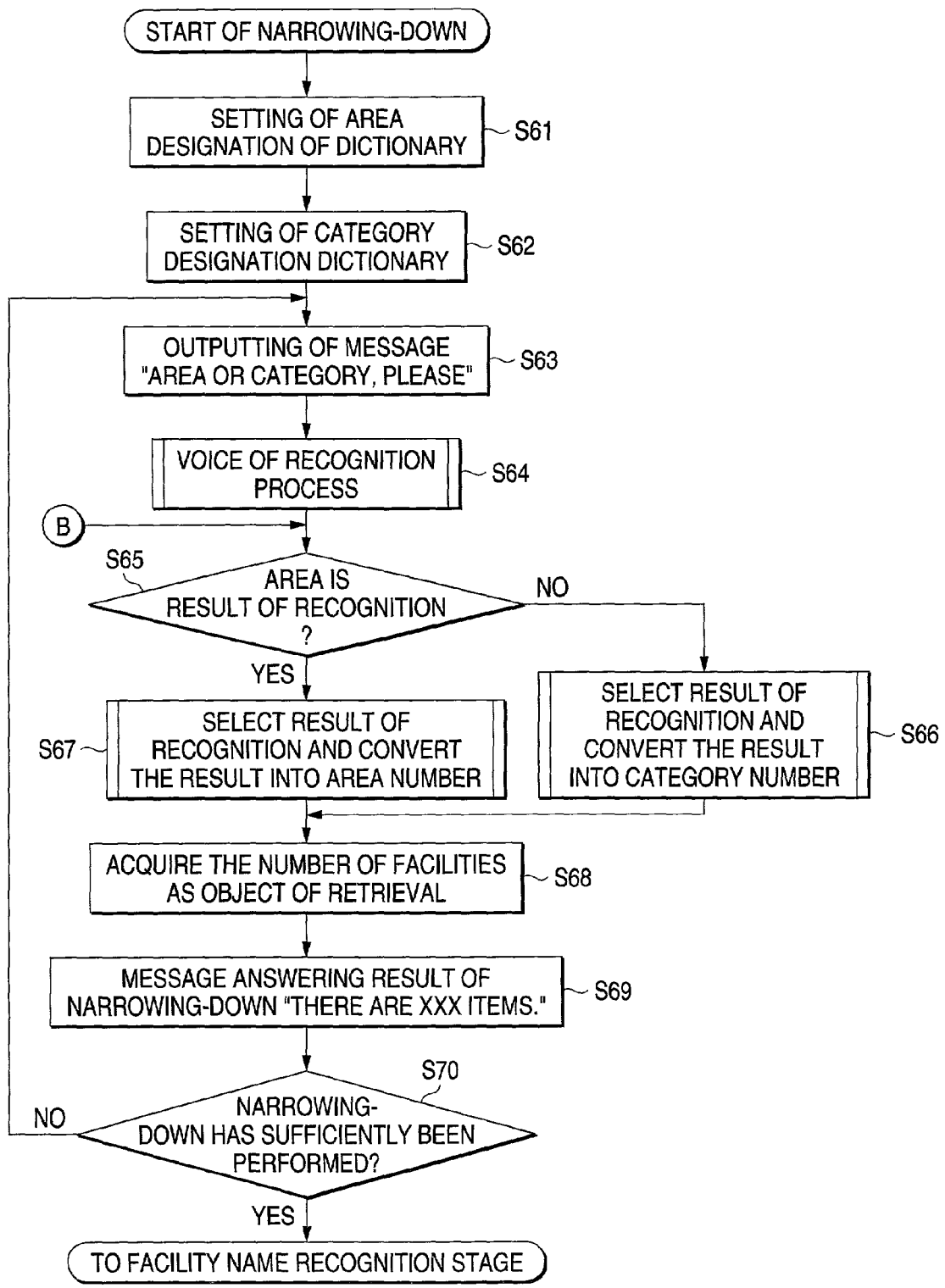
FIG. 6 is a flowchart cited for explaining the detail of a narrowing-down stage of FIG. 4.

A detailed operation at the narrowing-down stage of Step S41 in FIG. 4 will be shown in a flowchart of FIG. 6. In the flowchart shown in FIG. 6, the area name recognition dictionary used to designate the area and the category name recognition dictionary used to designate the category are transferred to the recognition dictionary storage portion 5 (Steps S61 and S62). After the termination of that transfer, a guidance message of urging the user to voice a message, for example, "An area name or a category name, please." is outputted (Step S63) to perform the voice recognition process (Step S64). Then a decision is made on whether the result of recognition exists in the area name recognition dictionary 61 or the category name recognition dictionary 62 (Step S65); in case where the result of recognition is the area name (Step S65 YES), the result of recognition is converted into a selective area number (Step S67).

In the area name recognition dictionary 6, an area number is affixed to each area name that includes a local name such as "the Kanto" or "the Kanto Region". When "the Kanto" is recognized, area numbers indicating Gunmma Prefecture, Tochigi Prefecture, Chiba Prefecture, Ibaragi Prefecture, Tokyo and Saitama Prefecture are chosen. In the area name recognition dictionary 61, further, an area designating word of "the whole country" is included and in case where "the whole country" is recognized, for example, area numbers indicating 47 prefectures are chosen.

On the other hand, in case where the result of recognition refers to the category name (Step S65 NO), the result of recognition is changed to a selective category number (Step S66).

In the category name recognition dictionary 62, a category number is affixed to each category name that includes category designation such as "a middle and a high school". When "the middle and high schools" is recognized, a category number indicating the middle and high schools is chosen. In the category name recognition dictionary 62, further, the negative category designation of "other than a dentist" is included and in case where "other than the dentist" is recognized, for example, category numbers respectively indicating a general hospital, a hospital, a hospital for the internal diseases, a surgical hospital, a children hospital, a hospital of ophthalmology, a hospital of otorhinolaryngology, a hospital of obstetrics and gynecology, a hospital of dermatology, and a hospital for animals are chosen.

The number of facilities as objects of retrieval is acquired by adding up the number of facilities coinciding with the selective area numbers and the selective category numbers obtained from the number-of-facilities retrieval table 911 shown in FIG. 2 and set through the above-described procedure (Step S68). In order to inform the user of the narrowing-down number of facilities as objects of retrieval, a message of "There are ○○ items of middle and high schools in the Kanto." is voiced via a speaker 12 (Step S69). Then by deciding whether the number of facilities as objects of retrieval is equal to or smaller than the predetermined number of them, for example, whether the number of facilities is equivalent to 50,000 items or less, a decision is made on whether narrowing-down has sufficiently been performed (Step S70).

In case where the number of facilities as objects of retrieval is greater than the predetermined number of facilities (Step S70 NO), the step S63 is followed again because the narrowing-down is needed under further detailed condition. In case where the number of facilities is smaller than the predetermined number of facilities (Step S70 YES), the narrowing-down stage is terminated and the next facility name recognition stage is followed. The decision of whether the narrowing-down has sufficiently been performed is made by, in addition to counting the number of facilities as objects of retrieval, deciding whether the recognition dictionary size determined by the number of facilities in the facility name dictionary as an object of retrieval is equal to or smaller than the predetermined size.

Figure 7:
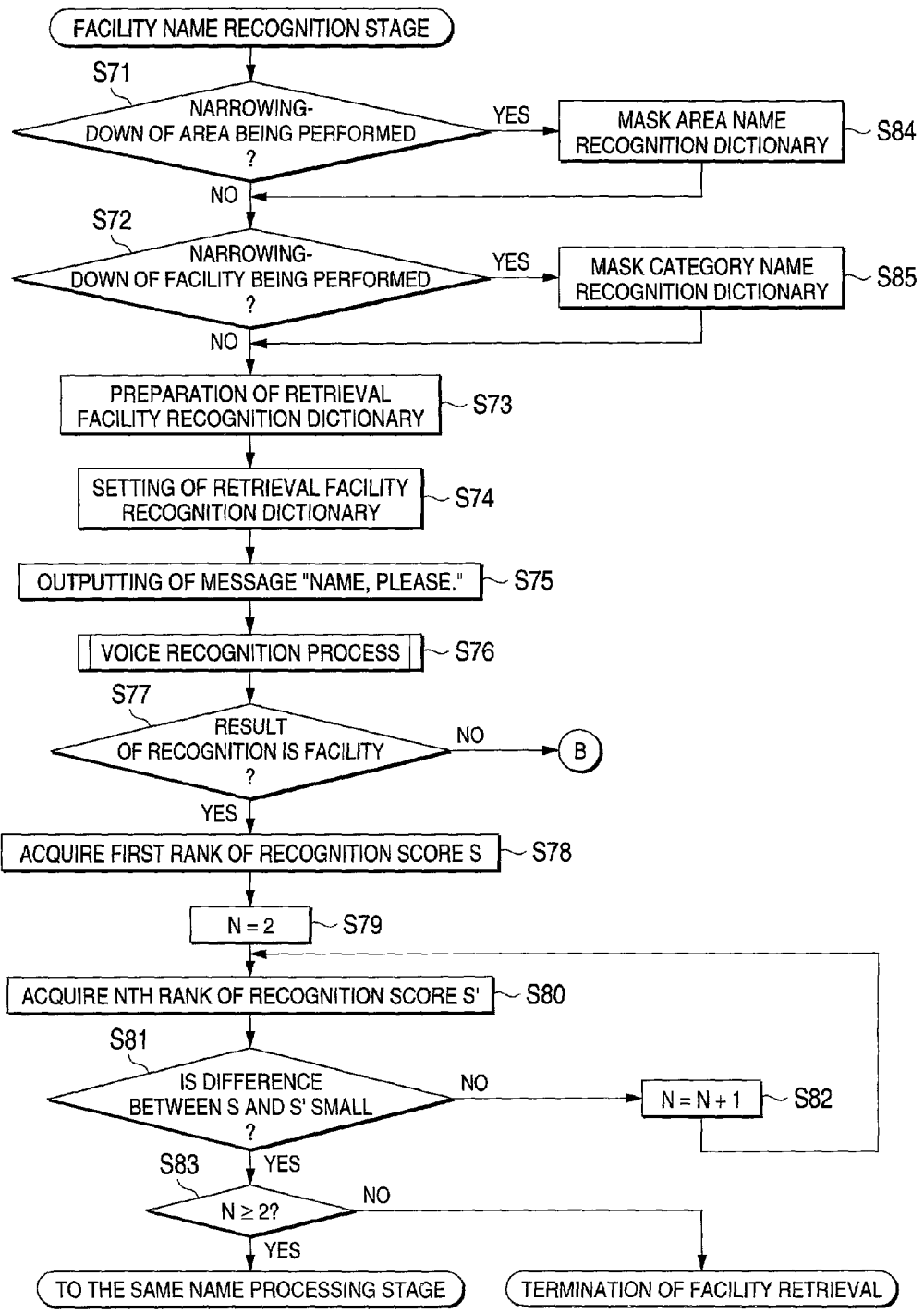
FIG. 7 is a flowchart cited for explaining the detail of a category name recognition stage of FIG. 4.

Details of the operation at the facility name recognition stage at Step S42 of FIG. 4 will now be described with reference to a flowchart in FIG. 7. A decision is made on whether the area narrowing-down condition is different from the initial value (a non-narrowing-down state) (Step S71). In case where the area narrowing-down condition is different from the initial value (Step S71 YES), it is decided that the area narrowing-down has been performed and the area name recognition dictionary 61 within the recognition dictionary storage portion 5 is masked so as to remove the area name from the object of recognition (Step S84).

Then a decision is made on whether the whole category name narrowing-down condition is selected (the non-narrowing-down state) by referring to the narrowing-down condition storage memory (Step S72). In case where it is decided that the narrowing-down of the category has been performed (Step S72 YES), the category name recognition dictionary 62 is masked so as to remove the category name from the object of recognition (Step S85). It is intended in this case that the unused narrowing-down condition at the narrowing-down stage can also be narrowed down even at the facility name retrieval stage.

In the recognition dictionary preparation portion 8, all the facility names equivalent to the recognition dictionary numbers corresponding to the narrowing-down condition from the retrieval facility information data table 91 are coupled together, so that one facility name recognition dictionary is prepared. Or otherwise the facility name recognition dictionary is prepared so that all the recognition dictionary corresponding to the narrowing-down condition can simultaneously be recognized (Step S73). The facility name recognition dictionary thus prepared herein is transferred to the recognition dictionary storage portion 5 (Step S74). After the setting of the facility name recognition dictionary is completed, a guidance message of urging the user to voice a message, for example, "A name, please." is outputted (Step S75) to perform the voice recognition process (Step S76).

While any one of the area name recognition dictionary 61 and category name recognition dictionary 62 is left unmasked at (Steps S71 and S72, the area or category name is voiced and the narrowing-down condition may be acquired as the result of recognition, so that a decision is made whether the result of recognition is the facility name (Step S77). In case where the result of recognition is not the facility name (Step S77 NO), Step S65 of FIG. 6 at the narrowing-down stage is followed again and narrowing-down is performed again.

In case where the result of voice recognition at Step S76 is the facility name (Step S77 YES), a facility name with the highest similarity (the recognition score is lowest) and its similarity (the recognition score (S)) is acquired (Step S78).

Then candidate numbers (N) are affixed to the facility names thus obtained in order of higher similarity and by making an object of comparison having a candidate number (N) of 2 a facility name with secondly higher similarity (Step S79). Thus, a facility name having a candidate number (N) as an object of comparison and its similarity (the recognition score (S')) are acquired (Step S80).

Further, the recognition score (S) of the facility name with the highest similarity is compared with the recognition score (S') of a facility name having a candidate number (N) and then a decision is made on whether the difference therebetween is equal to or smaller than a preset value (Step S81). In case where the difference between the recognition score (S) and the recognition score (S') is equal to or smaller than the preset value (Step S81 NO), the candidate number N as an object of comparison is incremented to N+1 and Step S8 is followed again. In case where the difference between the recognition score (S) and the recognition score (S') is greater than the preset value (Step S81 YES), on the other hand, a decision is made on whether the candidate number (N) of the recognition score (S') as an object of comparison is equal to or greater than 2 (Step S83). When the candidate number (N) is 1 (Step S83 No), the facility retrieval processing is terminated. When the candidate number (N) is equal to or greater than 2 (Step S83 YES) and the same name processing stage is followed.

The same name processing is performed because it is taken into consideration that a plurality of facilities having the same name or a plurality of facilities with messages quite similar to one another exist when an extremely wide range though the area is narrowed down in view of a category is designated.

An example of retrieving dentists at the municipal level under the designation of an area. Despite the fact that a user voiced a message of "Dentist Araki", "Dentist Aoki" ranked 1st in number as the result of recognition of facility names; "Dentist Aochi" ranked 2nd; "Dentist Araki" ranked 3rd; and "Dentist Sawaguchi" ranked 4th. In case where the recognition scores of the 1st to 3rd ranks are extremely close to one another, the result of retrieval is not specified at the present stage and the message voiced by the user is understood to be one of the 1st to 3rd ranks. Thus, the user's message is understood to signify one facility name at the same name processing stage as described below. In case where a plurality of facilities having the same name exist, the same name processing stage is invariably followed since the scores of the Nth and N+1th become identical.

Figure 8:
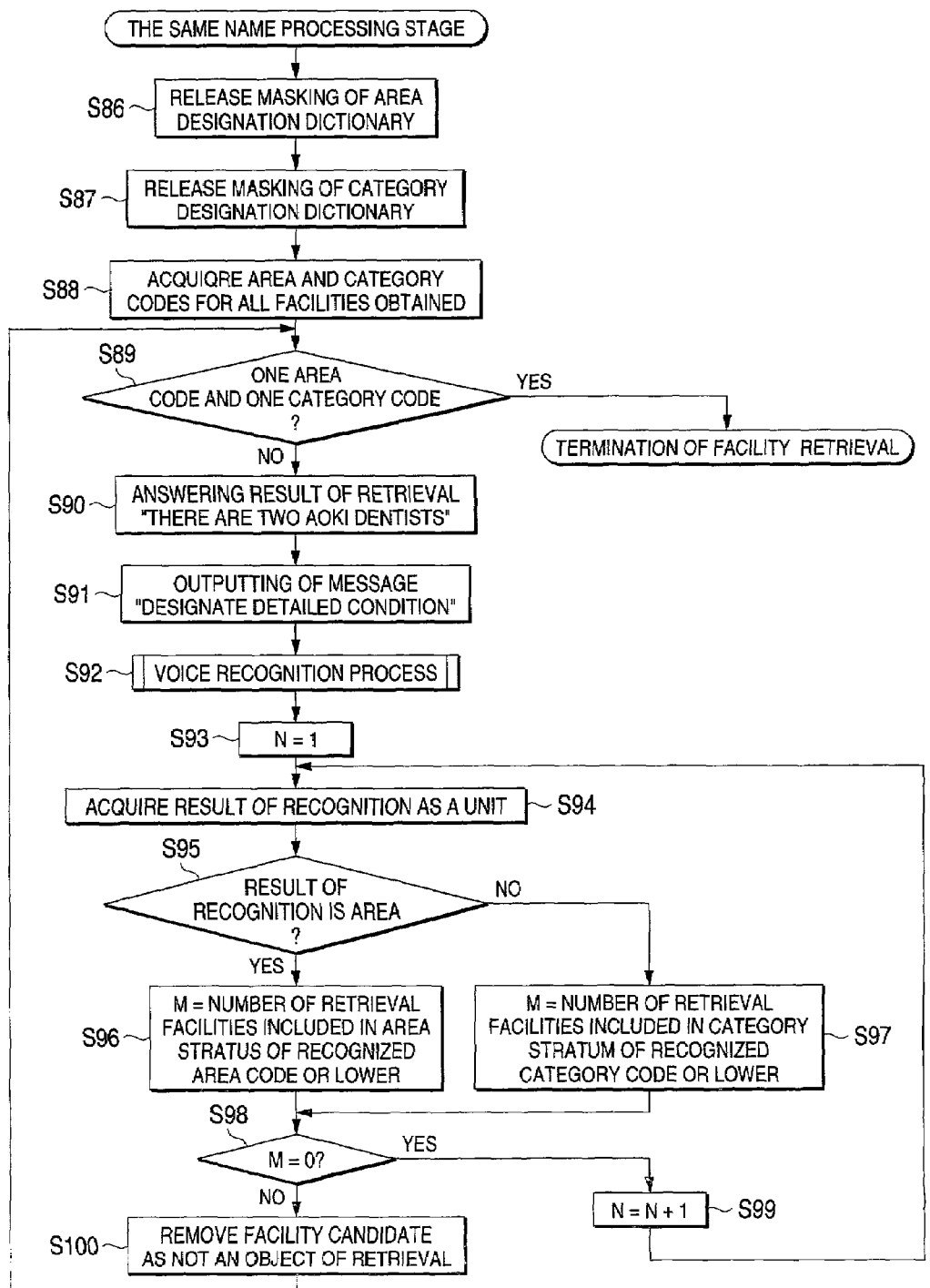
FIG. 8 is a flowchart cited for explaining the detail of a similar name processing stage of FIG. 4.

FIG. 8 is a flowchart for showing the details of the operation at the same name processing stage at Step S43 of FIG. 4. It is intended in the same name processing that in case where the plurality of facilities exist, one specific facility is determined by providing an additional condition.

As the plurality of the same facility names are determined to signify one facility name by asking the user to feed a detailed narrowing-down condition, the masks of the area name recognition dictionary 61 and the category name recognition dictionary 62 are released (Steps S86 and S87). With respect to the whole facility obtained now as candidates, their area numbers and category numbers are acquired by the facility information extracting portion 11 (Step S88).

The number of area and category numbers thus obtained is counted and then a decision is made on whether one kind of area name and one kind of category name exist (Step S89). Since there is provided only one facility name that belongs to the same area and the category in the voice recognition dictionary, it is decided whether the feeding of an additional narrowing-down condition is necessary by deciding whether one kind of area number and one kind of category number have been designated.

In case where one kind of area name and one kind of category number exist (Step S89 YES), the facility name retrieval is terminated by deciding that the number of facility names obtained as the result of the present retrieval is narrowed down to one item.

In case where a plurality of area codes or a plurality of categories exist (Step S89 NO), it is decided that the plurality of facility names obtained as the result of the present retrieval exist and the same name processing is continued. When the plurality of facility names exist then, the result of retrieval of the facility names obtained now is voiced and simultaneously outputted like "There are two items of dentists Aoki, one item of dentist Aochi and three items of dentists Araki." for example, (Step S90). Further, a guidance message of urging the user to voice a message, for example, "Is it the ○○ town?, is it the △△ city? Designate a detailed condition, please". (Step S91).

Then voice recognition is performed for narrowing down the detail (Step S92).

The candidate number (N) is affixed to each of the parameters stored in the recognition dictionary storage portion in order of higher similarity, and an area or category name with the candidate number (N) as an object of comparison, that is, its similarity is firstly highest (the recognition score is lowest) is made a narrowing-down condition name (Step S93) whereby to acquire the result of recognition of the candidate number (N) as the object of comparison (Step S94).

Further, a decision is made on whether the narrowed-down name as the result of recognition is the area name (Step S95). In case where it is the area name (Step S95 YES), the number of facilities (M) belonging to the area recognized at Step S94 out of the facility names obtained as the result of the present retrieval is counted (Step S96). In case where the narrowed-down name as the result of recognition is a category name (Step S95 NO), the number of facilities (M) belonging to the category recognized at Step S94 out of the facility names obtained as the result of the present retrieval is counted (Step S97).

Further, a decision is made on whether the number of facilities (M) is 0 (Step S98). In case where the number of facilities (M) is 0 (Step S98 YES), the candidate number (N) as the object of comparison is incremented to (N+1) (Step S99) with the narrowing-down condition recognized at Step S94 as being mistaken, Step S94 is followed again. In case where the number of facilities (M) is not 0 (Step S98), on the other hand, the facility name deemed to be out of the objects of comparison is removed from the candidate as the object of comparison (Step S100) and Step S88 is followed again.

Incidentally, in the narrowing-down dictionary portion 6, by relating the municipal name in the area name dictionary to what belongs to any one of the prefectures and by relating the dentist, ophthalmologist or general hospital in the category name dictionary in detail to what belongs to a large classification of hospitals for storing purposes, a decision is made on whether the result of recognition is obtainable because of narrowing down the present area names to the area name of the detailed municipal name or narrowing down the present categories to a detailed category name when the present area is the prefectural name. In case where a detailed narrowing-down condition exists, any facility in nonconformity with the detailed narrowing-down condition is deleted from the present candidate facility and further the inputting of the detailed narrowing-down condition is urged whereby to repeat this step until the facility names are narrowed down to one name.

As set forth above, according to the invention, the number of facility names is acquired from the area and classified facility names fed in through a given procedure by referring to the respective area and category name dictionaries both. When the number of facility names is equal to and smaller than the predetermined number of facilities, the facility name dictionary is prepared and the facility retrieval is carried out according to the name fed in by the use of the facility name dictionary, so that the user is allowed to easily retrieve facilities.

As set forth above, according to the invention, a problem arising from rendering area or category name retrieval infeasible because the area or category name is not found out can be cleared up as the user is allowed to freely designate a condition without restriction imposed by the system and to retrieve the facility name by means of voice, whereby retrieval corresponding to information in possession of the user. In case where a plurality of candidates are generated as the result of retrieval, moreover, because the system may ask the user area or category names necessary for specifying one name and the user is allowed to answer the question, facility retrieval can readily be performed by means of voice recognition.

What is claimed is:

1. A facility retrieval apparatus comprising:
   an area name dictionary stored with area names;
   a classified name dictionary stored with classified names of facilities;
   a facility name dictionary stored with facility names;
   input means for receiving an input from a user;
   identifying means for identifying, by referring to said area name dictionary and said classified name dictionary, whether each of a plurality of names input by the user is the name of an area name or a classified name, regardless of their order of input, and
   extracting means for extracting, from said facility name dictionary, a facility name satisfying a narrow-down condition designated by at least one name which is identified by said identifying means as said area name or said classified name.

2. A facility retrieval apparatus according to claim 1, further comprising:
   number-of facilities extracting means for extracting from said facility name dictionary a number of facility names satisfying the narrow-down condition designated by said at least one identified name; and
   urging means for urging input of said area names or said classified names if said number extracted facility names is greater than a predetermined number thereof;
   wherein said extracting means extracts from said facility name dictionary a facility name satisfying the narrow-down condition designated by said at least one identified name number of extracted facilities names is equal to or smaller than the predetermined number thereof.

3. A facility retrieval apparatus according to claim 1, further comprising:
   number-of-facility-names storage means for storing, for each narrow-down condition, the number of facility names satisfying a narrow-down condition designated by an arbitrary name within said area names and said classified names;
   number-of facilities extracting means for extracting from said facility name dictionary a number of facility names satisfying the narrow-down condition designated by said at least one identified name; and
   urging means for urging input of said area names or said classified names if said number of extracted facility names is greater than a predetermined number thereof;
   wherein said extracting means extracts from said facility name dictionary a facility name satisfying the narrow-down condition designated by said at least one identified name if the number of extracted facilities names is equal to or smaller than the predetermined number thereof.

4. A facility retrieval apparatus according to claim 2, wherein said urging means urges input of said facility names when said number of extracted facility names is greater than the predetermined number thereof and said at least one identified name is said classified name.

5. A facility retrieval apparatus according to claim 2, wherein said urging means urges input of further detailed area name when said number of extracted facility names is greater than the predetermined number thereof and said at least one identified name is said area name.

6. A facility retrieval apparatus according to claim 2, wherein the urging means urges input of said facility names after extracting said facility names by said extracting means.

7. A facility retrieval apparatus according to claim 6, further comprising:

specifying means for specifying one name out of said facility names by comparing an inputted name after executing the urging of inputting said facility names with said extracted facility names.

8. A facility retrieval apparatus according to claim 7, wherein the urging means urges the inputting of a name for a specifying purpose if said identifying means is unable to specify said one name out of said facility names.

9. A facility retrieval apparatus according to claim 8, wherein if said identifying means is unable to specify said one name out of said facility names the urging means urges the inputting of more detailed area names of classified names than said identified name as said name for the specifying purpose.

10. A facility retrieval method for use in a facility retrieval apparatus having an area name dictionary stored with area names, a classified name dictionary stored with classified names of facilities and a facility name dictionary stored with facility names, said method comprising of:

receiving an input from a user by input means;

identifying in identifying means, by referring to said area name dictionary and said classifying name dictionary, whether each of a plurality of names input by the user is the name of an area name or a classified name regardless of their order of input; and extracting in extracting means from said facility name dictionary, a facility name satisfying a narrow-down condition designated by at least one name which is identified by said identifying means as said area names or said classified names.

* * * * *